(12) United States Patent
El-Shimi et al.

(10) Patent No.: US 7,016,902 B2
(45) Date of Patent: *Mar. 21, 2006

(54) FLEXIBLE SUBSCRIPTION-BASED EVENT NOTIFICATION

(75) Inventors: Ahmed El-Shimi, Seattle, WA (US); Alexander E. Nosov, Bellevue, WA (US); Travis Muhlestein, Redmond, WA (US); Patrick R. Kenny, Redmond, WA (US); Raymond W. McCollum, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,522

(22) Filed: Mar. 9, 2005

(65) Prior Publication Data

US 2005/0149533 A1 Jul. 7, 2005

Related U.S. Application Data

(63) Continuation of application No. 10/122,621, filed on Apr. 15, 2002, now Pat. No. 6,931,405.

(51) Int. Cl.
*G06F 17/30* (2006.01)

(52) U.S. Cl. .................. 707/10; 707/5; 707/6; 707/102; 709/207; 709/226

(58) Field of Classification Search .................. 707/3, 707/5, 6, 10, 100, 102; 705/1, 35; 709/220, 709/225, 226, 229, 207, 318; 713/193
See application file for complete search history.

(56) References Cited

U.S. PATENT DOCUMENTS

| | | | |
|---|---|---|---|
| 5,925,108 A | | 7/1999 | Johnson et al. ............. 719/318 |
| 6,065,009 A | | 5/2000 | Leymann et al. ............. 707/10 |
| 6,298,378 B1 | * | 10/2001 | Angal et al. ................. 709/223 |
| 6,643,650 B1 | * | 11/2003 | Slaughter et al. ............. 707/10 |
| 6,658,568 B1 | * | 12/2003 | Ginter et al. ............... 713/193 |
| 6,766,368 B1 | * | 7/2004 | Jakobson et al. ............. 709/224 |
| 6,789,077 B1 | * | 9/2004 | Slaughter et al. ............. 707/10 |
| 6,859,829 B1 | * | 2/2005 | Parupudi et al. ............. 709/224 |
| 6,862,594 B1 | * | 3/2005 | Saulpaugh et al. ........... 707/10 |
| 6,931,405 B1 | * | 8/2005 | El-Shimi et al. ............. 707/10 |
| 2003/0046395 A1 | * | 3/2003 | Fleming et al. ............. 709/226 |

OTHER PUBLICATIONS

Aguilera, Marcos K. et al., "Matching Events in a Content-based Subscription System", Proceedings of the eighteen annual ACM symposium on Principles of Distributed Computing, 1999, pp. 53-61.*

Cabrera, Luis Felipe et al., "Herald: Achieving a Global Event Notification Service", Proceedings of the eighth workshop on Hot Topics in Operating Systems, May 20-22, 2001, pp. 87-92.*

(Continued)

*Primary Examiner*—Shahid Alam
(74) *Attorney, Agent, or Firm*—Workman Nydegger

(57) ABSTRACT

Subscription-based notification using event channels that each correspond to a particular scope. Each channel manages notifications through the use of a schema definition. The event subscriptions identify the position and attributes that any desired event notification would take in the schema definition. The channel then receives event notifications in the form of XML fragments. The channel then determines the position that the XML fragment would take as defined by the schema definition. The channel determines whether the position and attributes of the event notification matches the position and attributes of the event subscription. If a match is found, then the event notification is copied and forwarded to the recipient designated in the corresponding subscription.

18 Claims, 5 Drawing Sheets

OTHER PUBLICATIONS

Gore, Pradeep et al., "Designing and Optimizing a Scalable CORBA Notification Service", GOOGLE, pp., 1-10.*

Designing and Optimizing a Scalable CORBA Notification Service, P. Gore, et al., SIGPLAN Notices, Publ. by ACM, USA, Aug. 2001, vol. 36, No. 8, pp. 196-204.

Programmable Agents for Active Distributed Monitoring, E.S. Al-Shaer, Active Technologies for Network and Service Management, 10th IFIP/IEEE International Workshop on Distributed Systems: Operations and Management, DSOM '99. Proceddings (Lecture Notes in Computer Science), Publ. by Springer-Verlag, Berlin, Germany, 1999, vol. 1700, pp. 19-32.

Mount, J.; Automatic Detection of Potential Deadlock; *Dr. Dobb's Journal;* vol. 25; No. 12; Dec. 2000; pp. 64-72.

Wismuller, R. et al.; Enhanced Monitoring in the Grade Programming Environment by Using OMIS; *Future Generation Computer Systems;* vol. 16; No. 6; Apr. 2000; pp. 637-648.

* cited by examiner ns. Computer systems
FLEXIBLE SUBSCRIPTION-BASED EVENT NOTIFICATION

CROSS-REFERENCE TO RELATED APPLICATIONS

This application is a continuation of application Ser. No. 10/122,621, filed Apr. 15, 2002 now U.S. Pat. No. 6,931,405, and entitled "FLEXIBLE SUBSCRIPTION-BASED EVENT NOTIFICATION" the disclosure of which is incorporated herein by reference, in its entirety.

BACKGROUND OF THE INVENTION

1. The Field of the Invention

The present invention relates to event notification technology. More specifically, the present invention relates to methods, systems and computer program products for performing event notification based on subscriptions to a notification channel.

2. Background and Related Art

Most would agree that intelligent decision-making requires access to relevant and timely information. Computers have greatly enhanced our ability to access such information, resulting in this modern era often being termed "the information age".

Some access to information is synchronous or "pull-oriented". In other words, information is accessed each time a request for the information is submitted. There are some cases in which it may be inefficient to synchronously access information. For example, some information may be unexpected, yet still relevant. Of course, a user or application would not typically know to request information that was unexpected. Accordingly, technologies have developed that notify users or applications when an event of interest occurs asynchronously or, in other words, without requiring a corresponding request to inquire as to whether the event occurred.

Events of interest might include, for example, that a computer error has occurred since one might want to save data if one knows that the computer is becoming unstable. Also, one might want to know if a particular data field has a particular value or if a combination of data fields has a particular combination of data values. For example, an investor might want to know if the price of a stock drops below a particular value during a particular time of the year. Also, one might want to know of other asynchronous events such as, for example, the receipt of an e-mail from a particular sender.

One particular application that may be notified of the occurrence of events is an event log. Conventional event logs typically log a large number of events regarding a wide variety of subjects, regardless of whether any application or user is interested in any given event. If the user is interested in determining a particular sequence of events, then the user would typically view the entire log and visually track the events of interest to draw appropriate conclusions. For example, suppose that a computer systems crashes. A network administrator may view the event log, sift through all of the information to distinguish the relevant from the irrelevant, and then draw a conclusion based on the relevant information as to why the computer system crashed.

It is well recognized that the human brain is capable of performing astounding mental processes. For example, human users are often able to easily distinguish the relevant information from the irrelevant, and form judgments based on the relevant, even if there is very little consistent structure in how the information is represented. Computer systems are, however, more limited in their ability to interpret information that does not have a predictable structure.

Accordingly, log entries have some predictable structure that allows computers some ability to interpret information. For example, one conventional event log technology assigns a limited number of fields for each event entry. Such fields may include, for example, an event ID, an event source ID, an event type (e.g., information, warning, or error in increasing severity levels), and a description. The number and types of fields used to represent an event entry are not typically extensible. Accordingly, the type of event information that may be recorded is quite restricted.

One conventional method that somewhat reduces this restriction is to have applications draft a description that has some predetermined structure in the description field of the event entry. Then, applications that understand that structure may sift through the description and extract the intended meaning using the predetermined structure. This requires, however, that the application that interprets the description have an understanding of the predetermined structure. Conventionally, each application uses its own predetermined structure when writing the event description. Accordingly, the event description for every event may still be difficult to interpret due to that lack of standardization regarding how the description field should be structured.

Also, since the event log records all events, regardless of whether any g applications or users are interested in the event, precious computer processing and memory A resource may be wasted writing an event entry that is of no interest.

Accordingly, what is desired are event notification technologies that allow broad-based interpretation of events, and that reduces processing and memory resources when processing event of lesser interest.

BRIEF SUMMARY OF THE INVENTION

The foregoing problems with the prior state of the art are overcome by the principles of the present invention, which are directed towards methods, systems and computer program products for performing subscription-based event notifications in which the events are structured in accordance with a predetermined structure that is defined by, for example, a schema definition.

In accordance with the present invention, a distributed computer network, or even a single computer system, may include a number of event sources and a number of event consumers. A number of notification "channels" are established between the event sources and the event consumers. Each channel may correspond to a particular scope. For example, one channel may be for receiving debugging error events, another may be for e-mail related events, and yet another may be for calendar reminder events. Each channel may receive subscriptions to event notifications having particular characteristics. In addition, each channel may maintain its own security for determining the rights of the subscribers and publishers to the channel. Dividing the overall notification service into a number of channels allows for the better control over security for each channel.

Each notification channel may manage notifications through the use of a schema definition. The event subscriptions received from the event consumers uses a statement that identifies the position that any desired event notification would take in the schema definition. The event subscription may also identify characteristics or attributes associated with events of interest at that position. This may be accomplished using a conventional XPATH statement that identifies the node position in the schema definition as well as attributes of child nodes of interest.

The channel then receives event notifications from one or more event sources. The event notification may take the form of an XML fragment. The channel then determines the position that the received XML fragment would take as dictated by the schema definition. For each subscription, and for each event notification, the channel matches the event notification against the subscription. In particular, the channel determines whether the position and attributes of the event notification match the position and attributes of the event subscription. If a match is found, then the event is copied and forwarded to the recipient designated in the corresponding subscription. If a match is not found, then the event is not copied.

One way to accomplish this matching operation is to assign a filter to each subscription request. Each filter would be designed to receive event notifications and match those event notifications against a particular subscription. This may work fine for a small number of subscriptions, but may be inefficient for a larger number of subscriptions.

To make the filtering operation more efficient, the subscription requests may be reduced to a decision tree of filters. For example, suppose that the subscriptions all correspond to events that are fired from two processes, one having an identifier of 5, and one having an identifier of 6. The root filter in the decision tree may perform a test to see if the event subscriptions have been fired by a process other than process 5 or 6. If so, then the event notification may be immediately filtered out at the root filter. Accordingly, the other filters in the tree did not need to waste resources processing that event notification. The tree may be reconstructed in response to each subscription request so as to reduce the average processing resources needed for each event notification. With this structure, the processing may be made efficient enough to support real-time event notification processing.

Note that this event notification system allows the event consumers to control the filtering of event notifications. Accordingly, event notifications are filtered out to preserve processing accordance to the needs of the event consumers. If the event consumer was a logging application, then only those event notifications of interest would be logged. This sharply contrasts with conventional logging mechanisms, which typically log a large number of events regardless of whether there are any event consumers interested in the event.

Note also that the event notifications have a particular position as dictated by the schema definition. Each particular event type may have a corresponding schema that is appropriate for events of that type. The event consumer may use that corresponding schema to not only read the data from the event notification, but to also understand the meaning of that data and thus make intelligent decisions based on the data. The schema definition also allows for the number of event types to be extended, and to increase the number of fields corresponding to any given event type. Accordingly, logging need not be limited to a particular fixed number and type of fields and may more appropriate for given event types.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
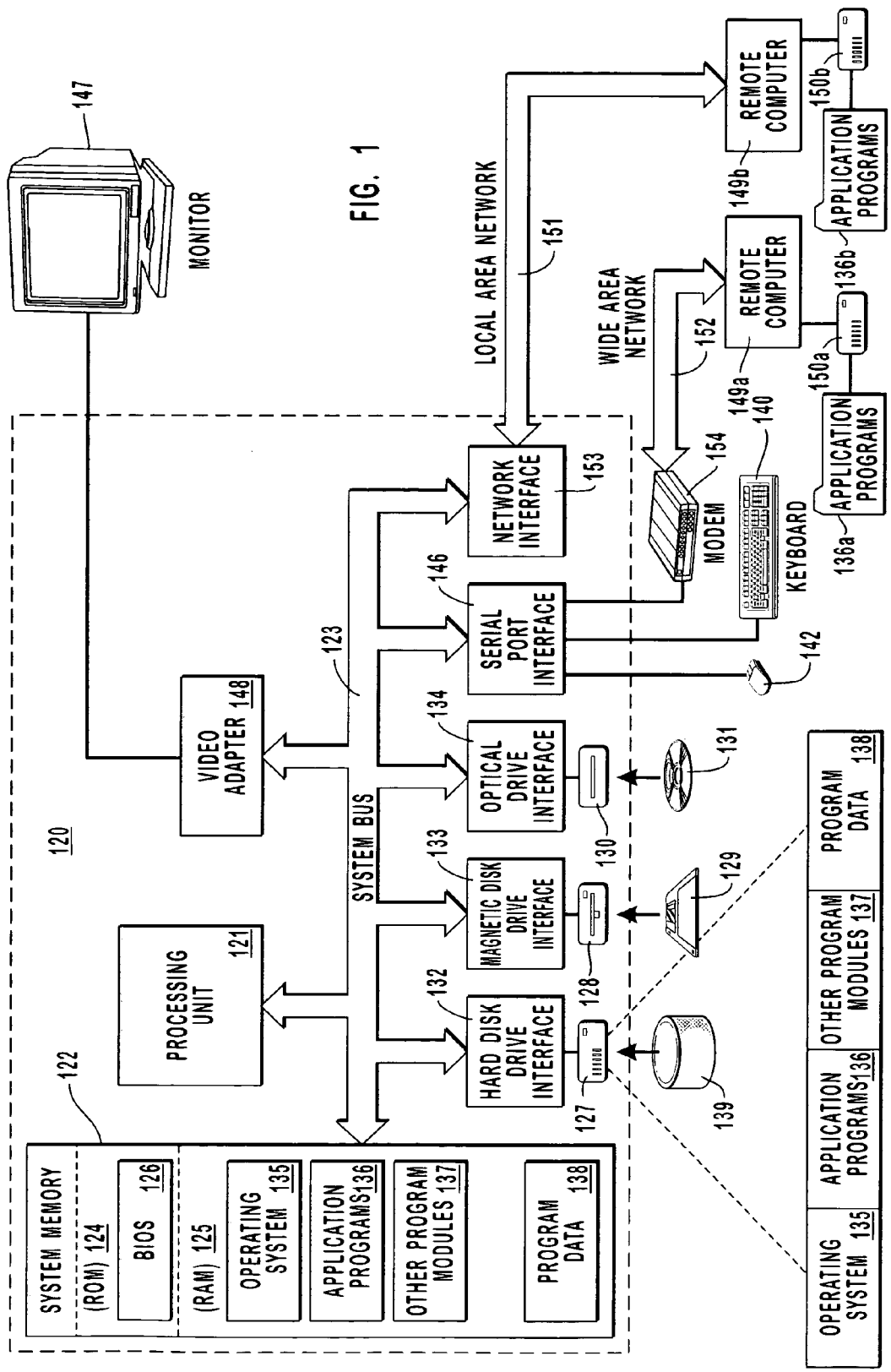
FIG. 1 illustrates a suitable operating environment for the principles of the present invention.

The present invention extends to methods, systems and computer program products for performing subscription-based notification using event channels that each correspond to a particular scope. Each channel manages notifications through the use of a schema definition. The event subscriptions received from the event consumers uses a statement that identifies the position that any desired event notification would take according to the schema definition. The event subscription may also identify characteristics or attributes associated with events of interest at that position.

The channel then receives event notifications from one or more event sources. The event notification may take the form of an XML fragment. The channel then determines the position that the XML fragment would take in the schema definition. The channel matches the event notification against the subscription. In particular, the channel determines whether the position and attributes of the event notification matches the position and attributes of the event subscription in the schema definition. If a match is found, then the event notification is copied and forwarded to the recipient designated in the corresponding subscription. If a match is not found, then the event subscription is not copied.

The embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general purpose computing device in the form of a conventional computing device 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138.

A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
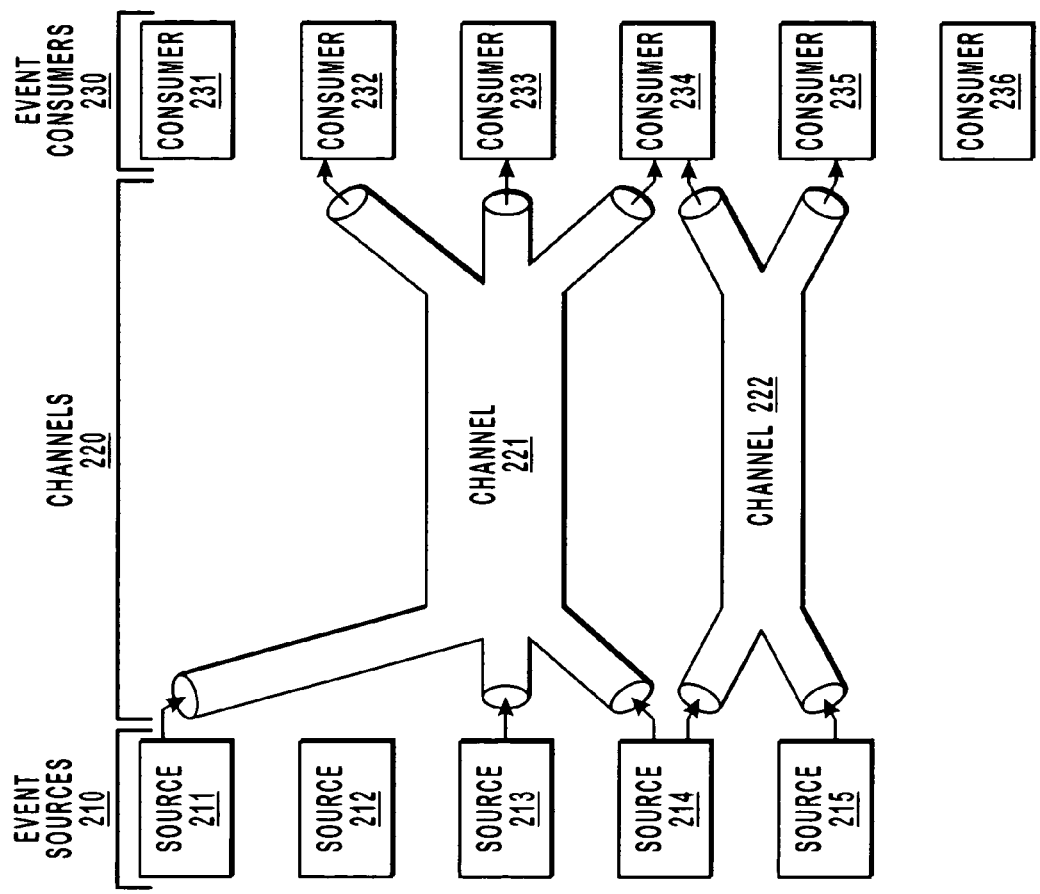
FIG. 2 schematically illustrates a number of event sources in communication with a number of event consumers over several notification channels.

FIG. 2 schematically illustrates a number of event sources 210 (including sources 211 through 215) in communication with a number of event consumers 230 (including consumers 231 through 236) over a number of notification channels 220 (including channels 221 and 222). Each event source 210 may be any event source that generates or forwards an event notification. Each event consumer 230 may be any event consumer that is capable of processing an event notification if even just to forward the event notification to another event consumer. The meaning of the channels will be described in further detail below. Although five event sources, six event consumers, and two channels are illustrated in the example of FIG. 2, the present invention is not limited to any particular number of event sources, event consumers, and channels. In fact, one advantage of the principles of the present invention is the ability to scale to any number of event sources, event consumers, or channels.

The event sources 210 and the event consumers 230 may be located within a single computer system such as the computer 120 described with reference to FIG. 1. However, at least some of the event sources 210 and/or the event consumers 230 may be located on other computer systems in a distributed environment.

The channels 220 represent live streams of events that are each targeted at a certain type of audience. Any of event sources 210 may publish events into a channel to target that audience (subject to security checks). The channels may be general usage channels that tend to be well known, or may be private application channels. In the example of FIG. 2, sources 211, 213 and 214 have security rights to publish into channel 221, while consumers 232, 233 and 234 have security rights to subscribe to events provided by the channel 221. Sources 214 and 215 have security rights to publish into channel 222, while consumers 234 and 235 have security rights to subscribe to events provided by the channel 222.

A single source may be able to publish into multiple channels. For example, source 214 publishes events into both channels 221 and 222. A source (e.g., source 212) may not be able to publish into any channels at all. Likewise, a single consumer may be able to subscribe to multiple channels. For example, consumer 234 has subscribed to both channels 221 and 222. On the other hand, a consumer (e.g., consumers 231 and 236) also may not be able to subscribe to any channels at all.

The channel may be any event stream that is targeted towards a particular audience. That audience may be "everyone" in which case any events may be published to the channel. However, particular advantages may be obtained if the audience is more specific. For example, one channel may be a "disk access" channel in which only events that relate to accessing a disk may be published. A more specific channel may be a "disk read access" channel in which only events related to read requests to a disk may be published. Another channel may be an "interrupt channel" that only allows events to be published that related to interrupts. Other channels may be "network channels" that focus on events related to sending or receiving over a network. Another more specific channel may be an "e-mail receipt" channel that focuses only on event related to e-mail.

A wide variety of event consumers may be interested in particular channel types. For example, a debugging application may be interested in events from the disk access, disk read access, and interrupt channels. E-mail and messaging applications may be interested in the network and e-mail receipt channels. After having reviewed this description, one of ordinary skill in the art will recognize that there are endless possibilities in the types and scope of channels that the principles of the present invention may employ.

One particular type of event consumer is a logging application. Each of the channels may have zero, one, or multiple event logs associated therewith. Since event logging is a common application of interested throughout any channel, the logging application may be incorporated within the channel itself. However, the logging applications are conceptually just another event consumer. Accordingly, for the majority of this description, logging applications may be treated just the same as any other event consumer.

Figure 3:
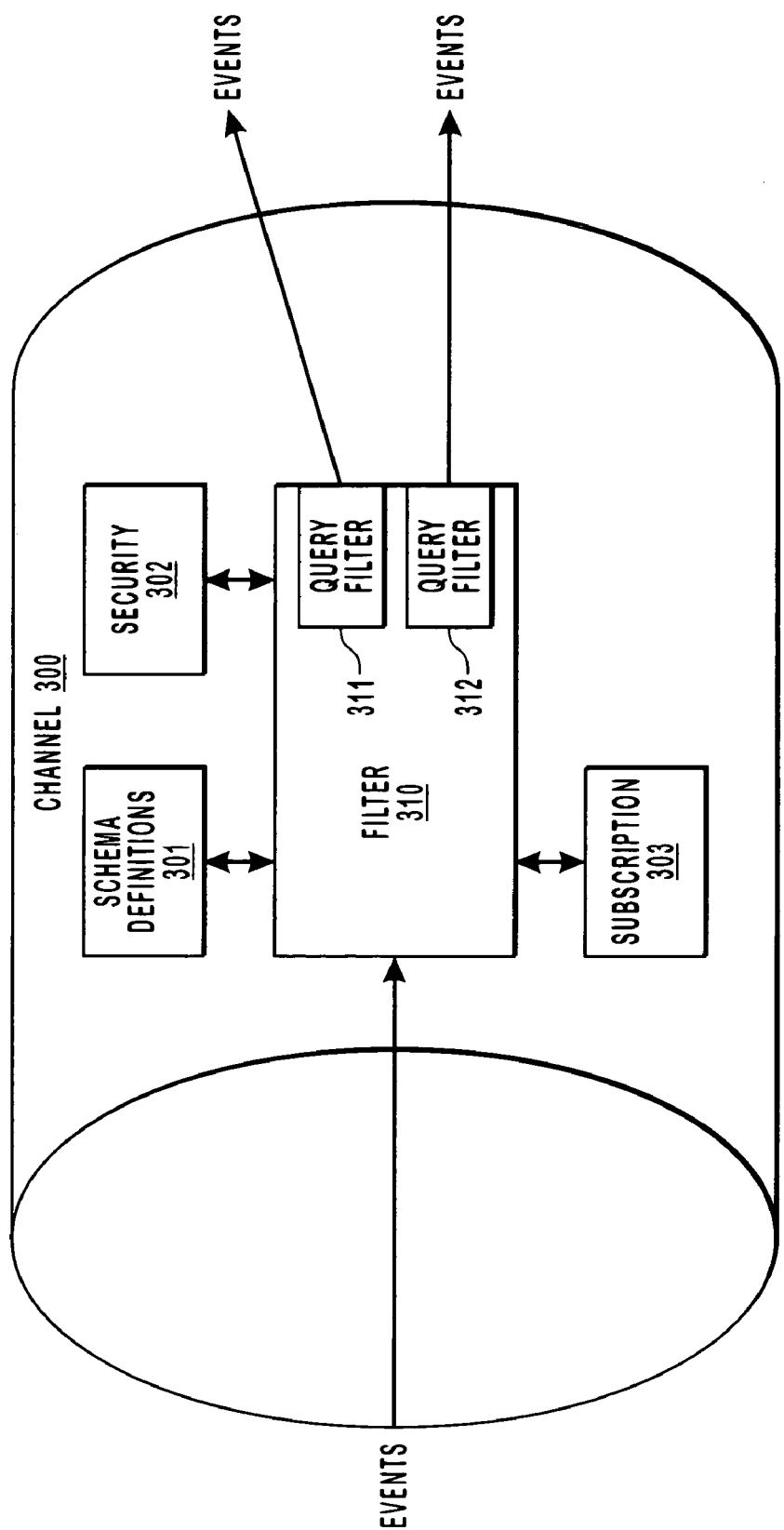
FIG. 3 schematically illustrates a notification channel in further detail.

FIG. 3 illustrates the structure of a channel 300 in more detail. The channel 300 may be, for example, one of the channels 220 illustrated in FIG. 2. The channel includes several components including a subscription module 303 that receives subscription requests from the event consumers 230. The subscription requests may be for event notifications having particular characteristics to be forwarded to the same entity that submitted the request. However, the requesting entity and the event consumer may be different entities. In other words, a subscription request may be made on behalf of another event consumer.

The subscription module 303 uses the security module 302 to determine if the subscription request should be honored. In particular, the security module 302 may be used to determine security clearances on several levels of granularity. For example, the security module 302 may be used to determine if the requesting entity has any security rights at all to subscribe to events published to the channel 300, if the requesting entity has security rights to subscribe to events that have the requested characteristics, or if the requesting entity has security rights to subscribe to events to be forwarded to a particular event consumer.

Security may also be imposed on publication requests from the event sources 210 to determine if the event source corresponding to a publication request has security rights w Z to publish events to the channel 300, or if the event source has security rights to publish events having particular characteristics to the channel. Through the use of the security module 302, the type of events that are received by a channel may be restricted as desired. Accordingly, channels may be specialized for particular topics, or made more general as desired. Channels may be made generally publicly accessible by virtually any event consumer or source. On the other hand, channels may be designated for private use by only one or a few event sources and consumers.

The channel 300 receives event and then passes events to any event consumer that subscribes to the event. Rather than comparing each event to each subscription request to determine which event consumer should be forwarded an event, the channel 300 uses a filter 310 that has a logical path to each possible event consumer. In the illustrated example, there are only two subscription requests, each resulting in a corresponding query filter 311 and 312. However, for larger numbers of subscription requests, the filter 310 may use a tree of filters as illustrated by the filter tree 400 of FIG. 4. The description of the filter tree 400 and its purpose is deferred until further in this detailed description.

The channel 300 also includes a schema definition 301. Received events may be self-describing or have a particular structure that may be mapped to particular positions in accordance with the schema definition 301. Likewise, subscription requests may be mapped to particular positions in accordance with the schema definition. In one example, the received event notification is an eXtensible Markup Language (XML) fragment, with the schema definition 301 being an XML Schema Definition (XSD) document. In this example, the subscription requests may include an XPATH statement that describes a particular position that is defined by the schema definition 301. The event notifications may be provided to each query filter.

If a match is found between the event notification and the subscription request corresponding to the query filter, then the event notification is permitted to pass the query filter. Otherwise, if no match is found, then the event notification is filtered out using the query filter. A match may be determined if the position the event notification would take as indicated by the schema definition corresponds to the position that the event subscribed to by the subscription request would take as indicated by the schema definition. Another required condition for matching is that the attributes of the desired events specified in the subscription request correspond to the event notification.

One way to accomplish this filtering operation for all of the subscription requests is to dedicate one filter (e.g., query filters 311 and 312) for each subscription request. For a small number of subscription requests, this may allow for generally real-time event notification to occur. However, this may be problematic for real-time event notifications if there are a large number of subscription request. In that case, each of the large number of processing requests would need dedicated memory and processing resources in order to filter the event notification.

Figure 4:
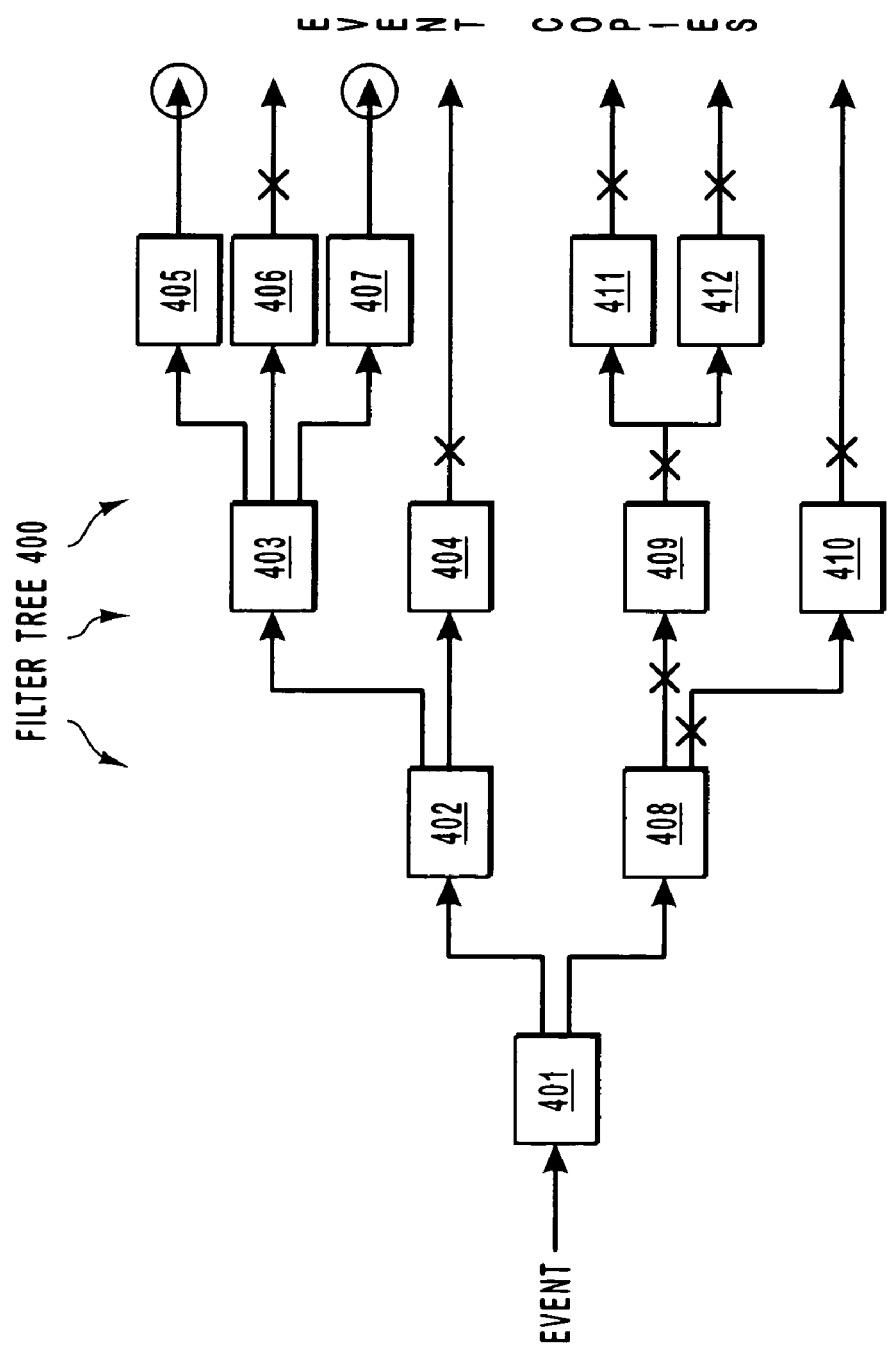
FIG. 4 illustrates a filter tree that may be used to efficiently filter event notifications.

FIG. 4 illustrates an example filter tree 400 that may be used within the filter 310 of FIG. 3. The filter tree 400 is designed to reduce or even minimize the number of filters that must deal with event notifications. For example, suppose that the event subscriptions are only for events that are fired by processes identified by an identifier 5 or an identifier 6. The root filter 401 in the filter tree 400 may filter out any event notifications that were not fired by processes 5 or 6. In the illustrated example in FIG. 4, the event passes the filter 401. Events received at a filter are represented by arrows arriving at the left portion of the filter. Events passing the filter are represented by arrows emitting from the right portion of the filter. An arrow with an "X" superimposed means that that would have been the event flow had the event not already been filtered out by some upstream filter. Arrows without the superimposed "X" means that the event notification has not been filtered out by an upstream filter.

In this example, second level filter 408 filters out the event notification. Accordingly, filters 409 through 412 do not need to deal with the event notification. Second level event filter 402, however, passes the event notification. Third level filter 404 filtered out the event notification, while third level filter 403 pass the event notification. Fourth level filter 406 filtered out the event notification, while fourth level filters 405 and 407 pass the event notification. Accordingly, the event notification is passed to two of the possible seven event consumers as represented by the arrows with the two circled arrow heads.

The average processing and memory resources required for processing event notification may be reduced by using such filter trees, especially for a much larger number of event subscriptions. In one example, the decision tree may be restructured every time a subscription request: is received. Alternatively, a subscription request may be assigned their own root level filter on a temporary basis until it is time for a periodic rebuilding of the filter tree. While such filter trees may not always result in less processing and memory resources for any given resources, the average per-event processing and memory resources may be significantly reduced.

Figure 5:
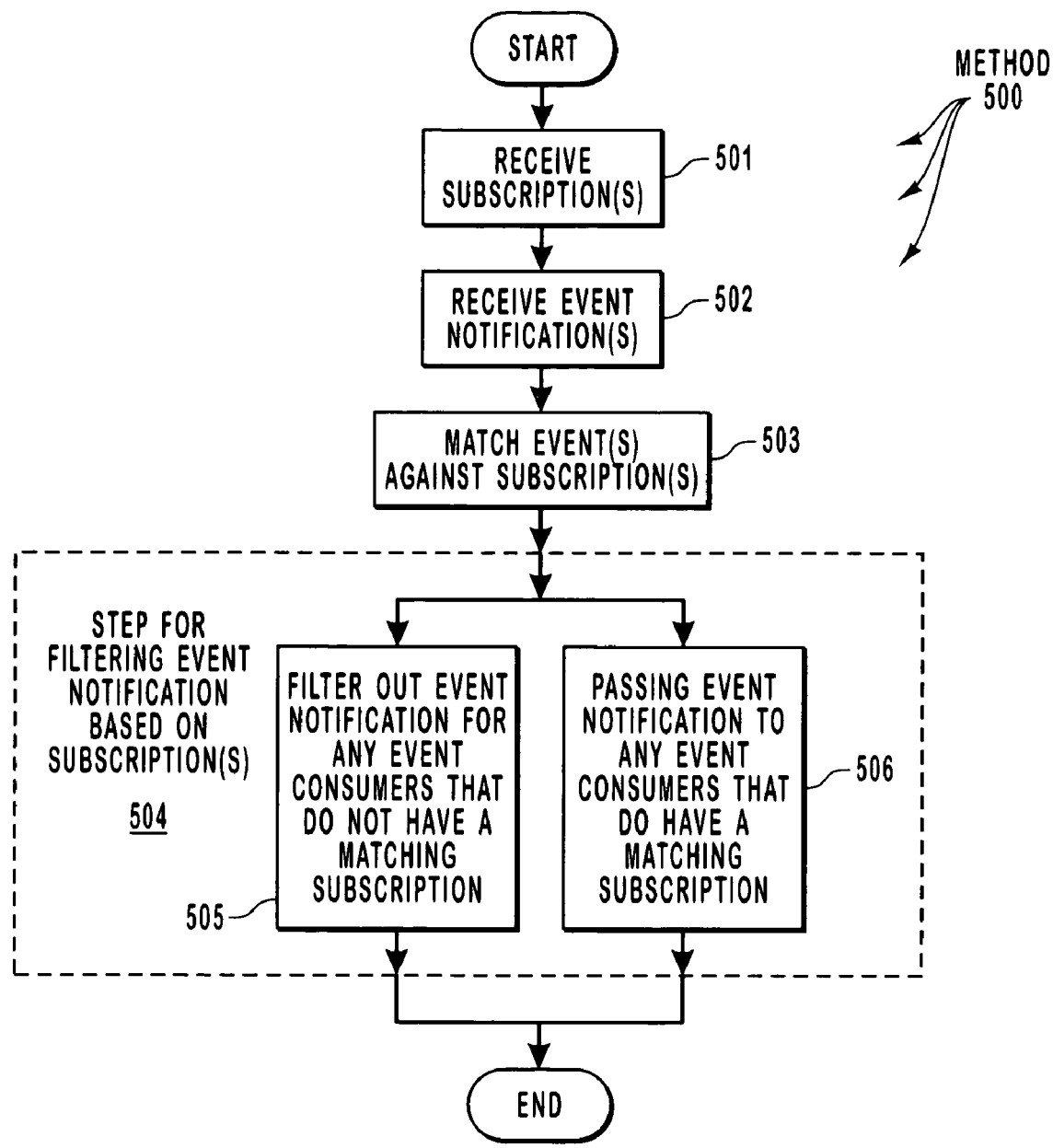
FIG. 5 illustrates a flowchart of a method for conditionally processing events in accordance with the present invention.

FIG. 5 illustrates a method 500 for performing subscription-based event notifications in accordance with the present invention. The method includes an act of receiving one or: more subscriptions from the one or more event consumers (act 501) and an act of receiving one or more event notification from one or more event sources (act 502). Although acts 501 and 502 are illustrated as occurring serially, subscriptions and events may be received at any time.

The method 500 then includes matching the event notification against the one or more subscriptions received from one or more event consumers (act 503). This matching may be performed by using the filter 310 of FIG. 3. The filter then performs a step for filtering the event notification based on the one or more subscriptions (step 504). This functional, result-oriented step may include any corresponding acts that accomplish the designated result. In one example, the step 504 includes a corresponding act of passing the event notification to each event consumers that submitted subscriptions that match the event notification (act 505), and a corresponding act of filtering out the event notification without passing the event notification to any event consumer that did not submit a subscription that matches the event notification (act 506).

Referring back to FIG. 2, the channel may communicate with the event sources and the event consumers via an Application Program Interface (API). The exact API is not important to the present invention so long as the API is recognized by the channel, the event sources, and the event consumers. The APIs may be defined so as to allow a broad range of functionality as will be apparent to those of ordinary skill in the art after having reviewed this description.

For example, the principles of the present invention may be used to perform flexible logging as well as concurrent real-time event notifications. For example, one of the event consumers may be a logging application that submits its own subscription requests to the channel. The channel then provides only those events that correspond to the subscription request to the log. Now, instead of recording every event that passes through the channel, the log records only the most relevant events to which it had subscribed. The logging application may be incorporated into the channel itself. A network administrator may use a user interface to cause the logging application to submit particular subscription requests that correspond to events of interest to the network administrator.

In addition, other event consumers may not necessarily record an event, but may otherwise use a real-time event notification. Such real-time event notifications may be controlled using the same mechanism used for logging. That is, the real-time event consumer submits a subscription request for events of interest. Then, the relevant events are passed from the channel to the event consumer at substantially the same time that the channel receives the event.

In addition, in some embodiments, the principles of the present invention use events that follow a particular schema. The schema definition may be flexible enough to allow for a wide number of name-value pairs corresponding to a particular event. In addition, the schema definition may be extensible. As a need for name-value pairs for a particular event arises, an event consumer or source may submit a request to extend a schema definition to include particular name-value pairs. For example, suppose that there is a particular schema that defines events regarding the receipt of an e-mail. The schema provides for a received time, a sender name, a size, a carbon copy list, and a subject line. Now suppose there becomes a need to also know the first ten words in the e-mail body. An event source or publisher may submit an API to extend the schema definition to include allowance for the first ten words of the e-mail body.

By using a schema that is understood by the event sources, the channels, and the event consumers, the meaning behind the event may be more intelligently interpreted. For understand that that is the current closing price of a particular index fund. The application may then be able to perform tasks with that value that it would not otherwise be able to perform without understanding the meaning behind the value. Accordingly, the principles of the present invention allow for a flexible and extensible way of representing meaningful information regarding events.

An additional advantage of the present invention is that events may be channeled through channels that are targeted at a specific audience by controlling which event sources and event types may be received at a particular channel. Accordingly, event consumers may deal with only those event channels that may be of interest. This results in an effective way of managing and organizing events.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. In a computer system that includes one or more event sources and one or more event consumers, a method for processing events fired by the one or more event sources based on subscriptions received by one or more event consumers, the method comprising the following:
    an act of receiving an event notification from an event source, for an event structured in accordance with a predetermined schema definition;
    an act of receiving one or more subscription requests from a requesting entity for one or more event notifications having one or more particular characteristics to be sent to one or more event consumers;
    an act of matching the one or more event notifications against the one or more subscriptions;
    an act of constructing a tree of filters that comprises a plurality of interconnected filters, the tree of filters incorporating the one or more subscription requests with any other previously received subscription requests; and
    a step for filtering the event notification based on the one or more subscriptions.

2. A method in accordance with claim 1, further comprising an act of determining that none of the one or more subscriptions match the event notification, wherein the step for filtering the event notification based on the one or more subscriptions comprises the following:
    an act of filtering out the event notification without passing the event notification to any event consumer.

3. A method in accordance with claim 1, further comprising an act of determining that at least one of the one or more subscriptions match the event notification, wherein the step for filtering the event notification based on the subscriptions comprises the following:
    an act of passing the event notification to each event consumer with a subscription that matches the event notification; and
    an act of filtering out the event notification without passing the event notification to any event consumer without a subscription that matches the event notification.

4. A method in accordance with claim 1, further comprising the following:
    an act of determining the position where the event notification would fit into the schema definition based on a classification of the event notification.

5. A method in accordance with claim 4, wherein the one or more subscription requests represent one or more positions within the schema definition, and wherein the act or matching the event notification against one or more subscriptions comprises the following:
    an act of determining whether the one or more schema definition positions represented by the one or more subscription requests corresponds to the position where the event notification fits into the schema definition.

6. A computer program product for use in a computer system that includes one or more event sources and one or more event consumers, the computer program product for implementing a method for processing events fired by the one or more event sources based on subscriptions received by one or more event consumers, the computer program product comprising one or more computer-readable media having stored thereon the following:
    computer-executable instructions for detecting receipt of one or more subscription requests from a requesting entity for event notifications having particular characteristics to be sent to one or more event consumers;
    computer-executable instructions for detecting the receipt of an event notification from an event source, for an event structured in accordance with a predetermined schema definition;
    computer-executable instructions for matching the event notification against the one or more subscriptions;
    computer-executable instructions for passing the event notification to each event consumer with a subscription that matches the event notification;
    computer-executable instructions for constructing a tree of filters that comprises a plurality of interconnected filters, the tree of filters incorporating the one or more subscription requests with any other previously received subscription requests; and
    computer-executable instructions for filtering out the event notification without passing the event notification to any event consumer without a subscription that matches the event notification.

7. A computer program product in accordance with claim 6, wherein the requesting entity is one of the one or more event consumers.

8. A computer program product in accordance with claim 6, wherein, the requesting entity is different from the one or more event consumers.

9. A computer program product in accordance with claim 6, wherein the event source and at least one of the event consumers reside in a single computer system.

10. A computer program product in accordance with claim 6, wherein the event source and at least one of the event consumers reside in different computer systems.

11. A computer program product in accordance with claim 6, wherein the one or more computer-readable media are physical storage media.

12. A computer program product in accordance with claim 6, wherein the one or more computer-readable media further have stored thereon the following:
   computer-executable instructions for determining whether the requesting entity has security rights to subscribe to event notifications.

13. A computer program product in accordance with claim 6, wherein the one or more computer-readable media further have stored thereon the following:
   computer-executable instructions for determining the position where the event notification would fit into the schema definition based on a classification of the event notification.

14. A computer program product in accordance with claim 13, wherein the computer-executable instructions for deleeting receipt of one or more subscription requests from a requesting entity comprises the following:
   computer-executable instructions for detecting receipt of a request that represents a position within the schema definition.

15. A computer-executable instructions in accordance with claim 14, wherein computer-executable instructions for matching the event notification against one or more subscriptions comprise the following:
   computer-executable instructions for determining whether one or more schema definition positions represented by the one or more subscription requests correspond to the position where the event notification fits into the schema definition.

16. A computer system comprising the following:
   one or more notification channels, each notification channel configured to receive event notifications of a particular classification, each notification channel comprising the following:
      a schema definition module configured to maintain a schema definition;
      a subscription module configured to receive one or more subscription requests from a requesting entity for one or more event notifications having one or more particular characteristics to be sent to an event consumer; and
      at least one filter configured to determine the position that an event notification received from an event source would m into a schema definition, and configured to filter out those event notifications that do not have a position in the schema definition that corresponds with the position represented by the one or more subscription requests, the at least one filter including a tree of filters that comprises a plurality of interconnected filters, the tree of filters incorporating the one or more subscription requests with any other previously received subscription requests.

17. A system in accordance with claim 16, wherein the at least one filter is configured as a tree of filters.

18. A system in accordance with claim 16, wherein each notification channel further comprises the following:
   a security module configured to check each subscription request to determine whether the subscription request should be fulfilled.

* * * * *

UNITED STATES PATENT AND TRADEMARK OFFICE
CERTIFICATE OF CORRECTION

PATENT NO. : 7,016,902 B2
APPLICATION NO. : 11/075522
DATED : March 21, 2006
INVENTOR(S) : El-Shimi et al.

Page 1 of 1

It is certified that error appears in the above-identified patent and that said Letters Patent is hereby corrected as shown below:

On the Title Page Item -56- on page 2, under "Other Publications", line 1, delete "Proceddings" and insert -- Proceedings --, therefor.

In column 1, line 8, after "2002" insert -- , --.

In column 2, line 28, after "any" delete "g".

In column 2, line 29, after "memory" delete "A".

In column 8, line 43–44, after "rights" delete "w Z".

In column 10, line 9, delete "or:" and insert -- or --, therefor.

In column 11, line 12, after "For" insert -- example, a stock application may not only be able to read the value 2025.57, but may also --.

In column 12, line 18, in Claim 5, after "act" delete "or" and insert -- of --, therefor.

In column 12, line 60, in Claim 8, after "wherein" delete ",".

In column 13, lines 18–19, in Claim 14, after "for" delete "deleeting" and insert -- detecting --, therefor.

In column 14, line 15, in Claim 16, after "would" delete "m" and insert -- fit --, therefor.

Signed and Sealed this

Eighteenth Day of August, 2009

David J. Kappos
*Director of the United States Patent and Trademark Office*